(12) United States Patent
Ando

(10) Patent No.: US 7,401,510 B2
(45) Date of Patent: Jul. 22, 2008

(54) HEATING RESISTOR TYPE AIRFLOW METER

(75) Inventor: Ryo Ando, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/206,772

(22) Filed: Aug. 19, 2005

(65) Prior Publication Data

US 2006/0162441 A1     Jul. 27, 2006

(30) Foreign Application Priority Data

Jan. 21, 2005    (JP) .............................. 2005-014278

(51) Int. Cl.
   *G01F 1/68*    (2006.01)
(52) U.S. Cl. .................................. 73/204.15
(58) Field of Classification Search ............... 73/204.15
   See application file for complete search history.

(56) References Cited

U.S. PATENT DOCUMENTS

| | | | | |
|---|---|---|---|---|
| 3,490,272 | A * | 1/1970 | Russell | ......................... 73/766 |
| 5,137,370 | A | 8/1992 | McCulloch et al. | |
| 5,616,843 | A * | 4/1997 | Schifferl et al. | .......... 73/204.15 |
| 5,685,194 | A | 11/1997 | McCulloch et al. | |
| 5,824,895 | A | 10/1998 | Itsuji et al. | |
| 6,032,525 | A | 3/2000 | Suetake | |
| 6,032,526 | A * | 3/2000 | Akamatsu | ................. 73/204.17 |
| 6,349,596 | B1 * | 2/2002 | Nakada et al. | ........... 73/204.26 |
| 6,450,024 | B1 | 9/2002 | McCulloch et al. | |

FOREIGN PATENT DOCUMENTS

| | | |
|---|---|---|
| JP | 8-304136 | 11/1996 |
| JP | 2002-116074 | 4/2002 |

* cited by examiner

*Primary Examiner*—Harshad Patel
(74) *Attorney, Agent, or Firm*—Mattingly, Stanger, Malur & Brundidge, P.C.

(57) ABSTRACT

The time it takes for a hot-wire airflow meter to begin to operate normally upon startup of an automobile is reduced. A heat-generating resistor Rh for measuring airflow rate, a temperature-compensating resistor Rc, and a resistor R1 for detecting the current through the heat-generating resistor are connected in parallel. A differential voltage between a power supply voltage Vb and the voltage across the emitter-collector junction of transistors Q1, Q2, or Q3 is applied to each of the heat-generating resistor Rh, temperature-compensating resistor Rc, and current-detecting resistor R1. The transistors Q1, Q2, and Q3 form a current mirror circuit 20, by which the ratio of currents through the heat-generating resistor Rh, temperature-compensating resistor Rc, and current-detecting resistor R1 is determined. The current ratio is maintained to be a predetermined ratio even if the heating current is controlled by an operational amplifier 21 due to an increase or decrease in airflow rate.

15 Claims, 9 Drawing Sheets

HEATING RESISTOR TYPE AIRFLOW METER

BACKGROUND OF THE INVENTION

1. Field of the Invention

The present invention relates to a hot-wire airflow meter for measuring airflow rate using a heat-generating resistor with temperature dependency.

2. Background Art

In a conventional hot-wire airflow meter used in an air induction system on, e.g., an automobile, such as one disclosed in Patent Document 1, a heat-generating resistor for measuring airflow rate, a resistor for detecting the current through the heat-generating resistor, and a power transistor for controlling the current are connected in series.

Patent Document 1: JP Patent Publication (Kokai) No. 2002-116074 A

SUMMARY OF THE INVENTION

In a hot-wire airflow meter, when the heat-generating resistor, the current-detecting resistor, and the power transistor are connected in series, a voltage that is the difference between the power supply voltage and the voltage across the power transistor is applied to the heat-generating resistor and the current-detecting resistor in a divided manner. The power supply voltage is usually the battery voltage.

Upon starting of an automobile, a large amount of current is consumed by the starter motor, such that the battery voltage becomes lower than normal. Meanwhile, because the heat-generating resistor possesses a heat capacity, it takes some time before the temperature of the heat-generating resistor increases up to a predetermined temperature. Unless the heat-generating resistor is heated to the predetermined temperature, the airflow meter cannot perform an accurate measurement. The time it takes for the heat-generating resistor to reach the predetermined temperature decreases as the power consumed by the resistor increases. Namely, the greater the voltage applied to the heat-generating resistor, the sooner can the airflow meter be activated.

Against the background of the increasingly more stringent automobile exhaust gas emission restrictions, there is a need to obtain an accurate airflow measurement value immediately after the start of engine.

It is therefore an object of the invention to provide a hot-wire airflow meter with improved startup characteristics by increasing the voltage applied to the heat-generating resistor without increasing the power supply voltage, such as that of the battery.

In one aspect, the invention provides a hot-wire airflow meter for measuring airflow rate using a heat-generating resistor and a resistance temperature detector for air temperature compensation, comprising:

a current source that determines the ratio of currents that flow through the heat-generating resistor and the resistance temperature detector; and a current-detecting resistor for indirectly detecting the current through the heat-generating resistor.

Preferably, the heat-generating resistor, the resistance temperature detector for air temperature compensation, and the current-detecting resistor are connected in parallel via the current source that determines the current ratio. Alternatively, the current-detecting resistor and the resistance temperature detector for air temperature compensation are connected in series, and these resistors and the heat-generating resistor are connected in parallel via the current source that determines the current ratio.

The current source may comprise a current mirror circuit and an amplifier, for example.

In accordance with the invention, the time it takes for the heat-generating resistor of the airflow meter to be heated up to a predetermined temperature can be reduced, so that, particularly as a signal for automotive engine control purposes, an accurate output can be obtained within a short period of time following engine startup. As a result, the amount of harmful exhaust emissions from the automotive engine can be reduced.

DESCRIPTION OF PREFERRED EMBODIMENTS OF THE INVENTION

Before describing the embodiments of the invention, the configuration of a conventional hot-wire airflow meter is described with reference to FIG. 1. The hot-wire airflow meter shown in FIG. 1, which is of the type using a bridge circuit, is used for measuring intake air in an automotive engine, for example.

Figure 1:
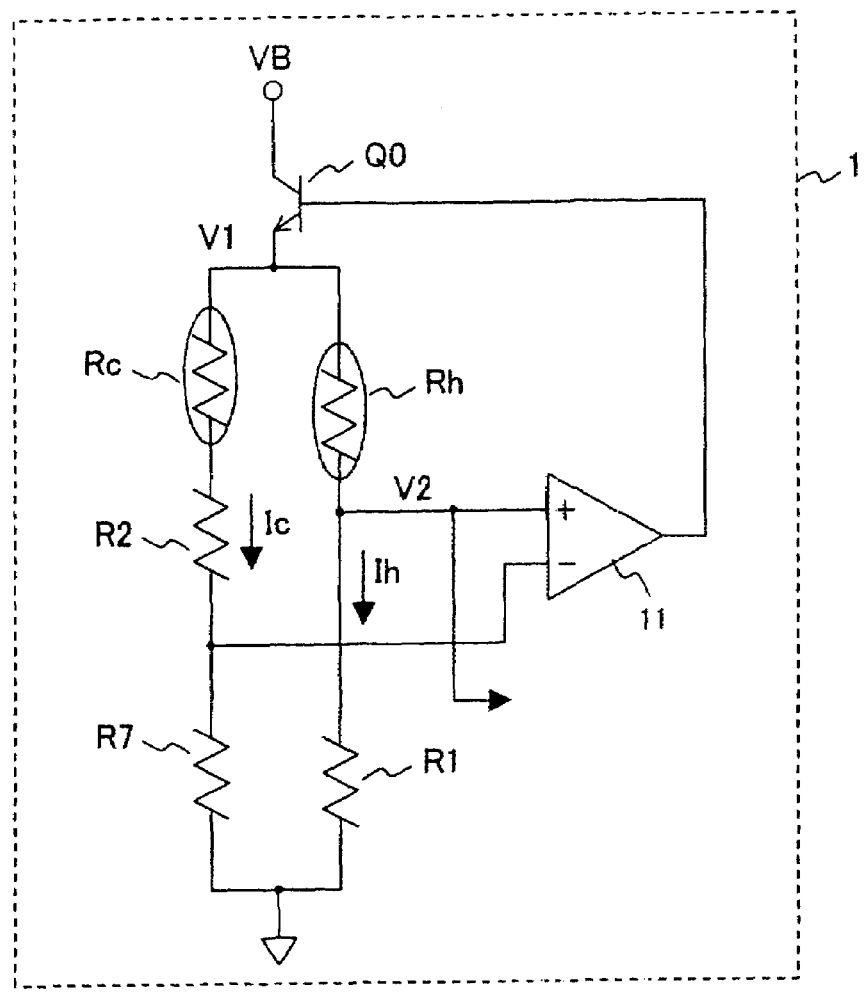
FIG. 1 shows a circuit diagram of a conventional hot-wire airflow meter.

With reference to FIG. 1, an automotive battery voltage is used as a power supply voltage VB for the airflow meter 1. A heat-generating resistor Rh for airflow measurement and a resistance temperature detector Rc for air temperature compensation form, together with a current-detecting resistor R1 and fixed resistors R2 and R7, a Wheatstone bridge circuit. The center voltage of the bridge circuit is inputted to an operational amplifier 11. Specifically, a voltage V2 between the heat-generating resistor Rh and the current-detecting resistor is inputted to the non-inverting input (+) terminal of the operational amplifier 11, and a reference voltage between the resistance temperature detector Rc (including the fixed resistor R2) and the fixed resistor R7 is inputted to the inverting input (−) terminal. The output of the operational amplifier 11 is inputted to the base of a power transistor (NPN transistor) Q0 for heat current control.

The heat-generating resistor Rh and the resistance temperature detector Rc for temperature compensation are both resistance temperature detectors with temperature dependency. They are disposed in an air duct. With regard to the calorific power generated by the heat-generating resistor Rh, which is heat-exchanged with the airflow rate (speed of flow) and thereby dissipated, heating current Ih is controlled by the operational amplifier 11 and the transistor Q0 such that the resistance difference (temperature difference) between the heat-generating resistor Rh and the resistance temperature detector Rc has a predetermined difference value. By then converting the heating current Ih into voltage using the resistor R1, airflow rate can be measured.

Figure 2:
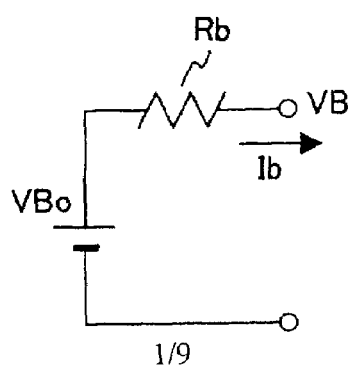
FIG. 2 shows an equivalent circuit diagram of a battery.

Automotive batteries have an internal resistance Rb, as shown in FIG. 2. When the battery output voltage VB that is measured in the absence of output current Ib from the battery is VBo, the output voltage VB when output current Ib flows from the battery can be expressed by:

$$VB = VBo - Rb \times Ib \tag{1}$$

Upon starting of the engine, a large amount of current is consumed by the starter motor so that the output current Ib from the battery increases. As a result, the output voltage VB decreases due to an increase in voltage dropped across internal resistance Rb.

Upon starting of the engine, the battery output voltage VB is also applied to the airflow meter 1, thereby activating the same. In order for the airflow meter 1 to output a normal airflow signal, the temperature of the heat-generating resistor Rh must have been increased to a predetermined temperature. The temperature of the heat-generating resistor Rh is increased by the power consumed by it. When the current that flows through the heat-generating resistor Rh is Ih, the power Wh consumed by the detection resistor Rh is expressed by:

$$Wh = Rh \times Ih^2 \tag{2}$$

The current Ih that flows through the heat-generating resistor Rh is expressed by:

$$Ih = (VB - Vce0)/(Rh + R1) \tag{3}$$

where Vce0 is the emitter-collector voltage of the transistor Q0, and R1 is the resistor for current detection.

From equations (2) and (3), the power Wh consumed by the heat-generating resistor Rh is expressed by:

$$Wh = Rh \times ((VB - Vce0)/(Rh + R1))^2 \tag{4}$$

To obtain a normal airflow signal as soon after the start of engine as possible, it is effective to increase the power consumption Wh in the heat-generating resistor Rh so as to shorten the temperature-rise time of the heat-generating resistor Rh.

As will be seen from equation (4), the smaller the resistance value of the current-detecting resistor R1, which is connected to the heat-generating resistor Rh in series, the greater the power consumption Wh of the heat-generating resistor Rh. In other words, the power consumption Wh becomes greatest in the absence of current-detecting resistor R1, when the temperature-rise time becomes shortest.

The current-detecting resistor R1 operates in conjunction with the fixed resistor R7 to maintain the ratio of the current Ih that flows through the heat-generating resistor Rh and the current Ic that flows through the resistance temperature detector Rh. In a conventional airflow meter, the ratio of the current Ih that flows through the heat-generating resistor Rh and the current Ic that flows through the resistance temperature detector Rc can be expressed by:

$$Ih/Ic = R7/R1 \tag{5}$$

Thus, in the configuration of the conventional airflow meter, the current-detecting resistor R1 cannot be eliminated.

Figure 3:
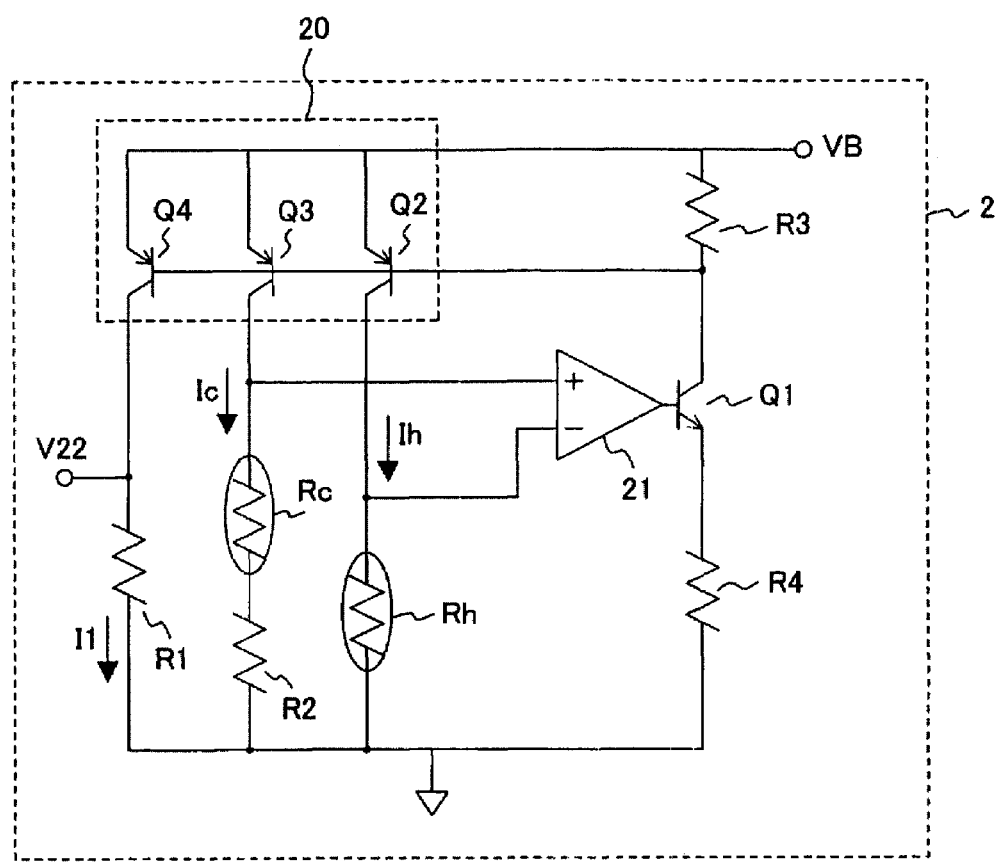
FIG. 3 shows a circuit diagram of a hot-wire airflow meter according to an embodiment of the invention.

In accordance with the invention, the current-detecting resistor R1 is connected to the heat-generating resistor Rh in parallel as in the embodiment shown in FIG. 3, rather than in series, which is the case with the conventional example. Furthermore, while conventionally the current source for a flow rate detecting unit is realized with transistor Q0 and the current ratio is adjusted with resistors R1 and R7, the invention provides for a current source that determines the ratio of current Ih that flows through the heat-generating resistor Rh, current Ic that flows through the resistance temperature detector Rc, and current I1 that flows through the current-detecting resistor R1. For example, the current source for a sensing unit (the heat-generating resistor and the resistance temperature detector for air temperature compensation) and the ratio of currents that flow through these resistors are matched solely with a plurality of transistors, such as those in a current mirror circuit, without using the detecting resistor R1 and the fixed resistor R7.

In the case of the hot-wire airflow meter according to the embodiment shown in FIG. 3, a current source is comprised of a current mirror circuit 20, an operational amplifier 21, and transistor Q1. The current mirror circuit 20 is comprised of a first transistor Q2, a second transistor Q3, and a third transistor Q4 connected in parallel.

The first transistor Q2 and a heat-generating resistor Rh are connected in series. The second transistor Q3 and a resistance temperature detector Rc for air temperature compensation are connected in series. The third transistor Q4 and a current-detecting resistor R1 are connected in series. The transistors Q2, Q3 and Q4 of which the current mirror circuit 20 of the present embodiment is formed are PNP transistors, with a power supply VB connected to the emitters and with the individual resistors Rh, Rc, and R1 connected to the respective collectors.

A voltage between the heat-generating resistor Rh and the first transistor Q2, and a voltage between the resistance temperature detector Rc for air temperature compensation and the second transistor Q2 are inputted to the operational amplifier 21. Specifically, the voltage between the heat-generating resistor Rh and the first transistor Q2 is inputted to the non-inverting input (−) terminal of the operational amplifier 21, while the voltage between the resistance temperature detector Rc for air temperature compensation and the second transistor Q2 is inputted to the (+) input terminal of the operational amplifier 21. The resistance temperature detector Rc for air temperature compensation has the same temperature coefficient as that of the heat-generating resistor Rh and a resistance value that is N (N is a positive constant) times greater.

The transistor Q1, which is made of an NPN transistor, is used for producing the base current for the individual transistors Q2 to Q4 of the current mirror circuit 20. The output of the operational amplifier 21 is connected to the transistor Q1.

In this circuit configuration, the currents that flow through the individual resistors Rh, Rc, and R1 are controlled by the first through third transistors Q2 to Q4 such that a predetermined ratio is maintained among the currents.

While the resistance value of the heat-generating resistor Rh varies depending on the increase or decrease in the airflow rate, the operational amplifier 21 controls, via the transistor Q1, the base current that flows through the transistor Q2 of the current mirror circuit 20 and therefore the emitter current and the heating current (collector current) Ih, such that the resistance temperature detector Rc and the heat-generating resistor Rh maintain a predetermined resistance (temperature) difference value. Even if the heating current Ih varies, the ratio of the current Ih, the current that flow through the resistance temperature detector Rc, and the current that flows through the fixed resistor R4 is controlled to have a predetermined value by transistors Q2 to Q4 of the current mirror circuit.

The ratio of the current Ih that flows through the heat-generating resistor Rh and the current Ic that flows through the resistance temperature detector Rc is determined by the current characteristics of transistors Q2 and Q3 that form the current mirror circuit. For example, the ratio of the emitter size of the transistors can be adjusted, or the ratio of the numbers of transistors can be adjusted by employing a plurality of transistors for each of transistors Q2 and Q3.

For example, when the number of transistors Q2 and Q3 shown in FIG. 3 is such that their ratio is N:1, the ratio of the current Ih that flows through the heat-generating resistor Rh and the current Ic that flows through the resistance temperature detector Rc is expressed by:

$$Ih/Ic = N \quad (6)$$

From equations (5) and (6), we have, for FIG. 1:

$$R7/R1 = N \quad (7)$$

Thus, it can be seen that the heat-generating resistor Rh in the airflow meter 1 of FIG. 1 and that in the airflow meter 2 of FIG. 3 are equally controlled.

The heat-generating resistor Rh has temperature characteristics, so that its resistance value is dependent on temperature. In the circuit of the airflow meter 2 of FIG. 3, Rh has its temperature controlled so as to produce a resistance value expressed by:

$$Rh = Ic/Ih \times (Rc + R2) \quad (8)$$
$$= (Rc + R2)/N$$

The current-detecting resistor R1 and the heat-generating resistor Rh of the airflow meter 2 shown in FIG. 3 are also disposed in parallel via the current mirror circuit consisting of the transistors Q2 and Q4, as mentioned above. If the characteristics of the transistors Q2 and Q4 are identical, the current I1 that flows through the current-detecting resistor R1 would be equal to the current Ih that flows through the heat-generating resistor Rh, resulting in a voltage V22 across current-detecting resistor R1 that is equal to voltage V2 across the current-detecting resistor R1 of the airflow meter 1 of FIG. 1.

Thus, the conventional airflow meter 1 and the airflow meter 2 of the embodiment equally operate in a steady state. The advantage of the airflow meter 2 of the invention is that the maximum voltage that can be applied to the heat-generating resistor Rh can be increased.

Specifically, in the case of the embodiment shown in FIG. 3, the ratio of the current Ih that flows through the heat-generating resistor Rh and the current Ic that flows through the resistance temperature detector Rc is matched without using the current-detecting resistor R1 or the fixed resistor R7. As a result, the power consumption Wh in the heat-generating resistor Rh can be increased, so that the temperature-rise time of the heat-generating resistor Rh can be shortened.

Figure 11A:
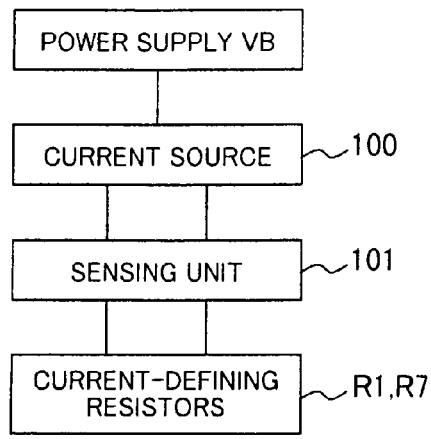
FIG. 11 shows the principle of the conventional airflow meter and the airflow meter according to the invention.
Figure 11B:
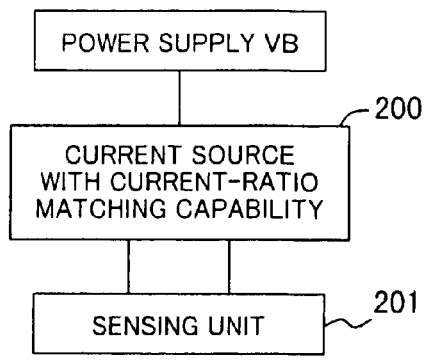

FIG. 11 shows the principle of the conventional airflow meter 1 and the airflow meter 2 of the invention. FIG. 11(a) relates to the conventional system consisting of a single power supply 100 (transistor Q0 of FIG. 1), a sensing unit (heat-generating resistor and temperature-compensating resistor) 101, and a fixed resistor (R1, R7) for determining (adjusting) the current ratio. On the other hand, the system of the invention consists of a parallel current source 200 (which is equivalent to the current mirror circuit 20 of FIG. 3) whereby the current ratio is determined (matched), a sensing unit (heat-generating resistor and temperature-compensating resistor) 201, and a current-detecting resistor R1 for detecting, indirectly, the current through the heat-generating resistor.

The maximum voltage Vh1max that can be applied to the heat-generating resistor Rh in the conventional airflow meter 1 is expressed by equation (9), while the maximum voltage Vh2max that can be applied to the heat-generating resistor Rh in the airflow meter 2 of the present embodiment of the invention is expressed by equation (10):

$$Vh1\max = (VB - Vce0) \times Rh/(Rh + R1) \quad (9)$$

$$Vh2\max = VB - Vce2 \quad (10)$$

In the case of equations (9) and (10), the emitter-collector voltages of the individual transistors can be regarded as substantially the same. Therefore, the maximum voltage Vh2max that can be applied to the heat-generating resistor Rh in the airflow meter 2 is (Rh+R1)/Rh times the maximum voltage Vh1max that can be applied to the heat-generating resistor Rh of the airflow meter 1.

In the airflow meter 2 of FIG. 3, a resistor R3, which is used for preventing the fluctuation of the current that flows through the current mirror even if noise appears in the battery voltage VB, is disposed between the battery VB and the bases of the transistors of the current mirror circuit. A resistor R4, which is for preventing oscillation due to the provision of the resistance R3, is disposed between the base of the transistor Q1 and ground.

The resistance temperature detector Rc is provided so as to compensate for air temperature, which is another factor influencing, in addition to airflow rate, the temperature control of the heat-generating resistor Rh. Specifically, the resistance temperature detector Rc causes the controlled temperature (target temperature) of the heat-generating resistor Rh to be changed by an amount corresponding to the amount of change in air temperature. The amount of heat dissipated by the heat-generating resistor Rh is proportional to the temperature difference between the heat-generating resistor and air, as well as the airflow rate. As will be seen from equation (8), if the temperature characteristics of the resistance value of the resistance temperature detector Rc are N times the temperature characteristics of the resistance value of the heat-generating resistor Rh, the ratios of the heat-generating resistor Rh and the resistance temperature detector Rc and the change in air temperature can be made equal.

For example, it is assumed that the temperature characteristics of the heat-generating resistor Rh are expressed by equation (11) and those of the resistance temperature detector Rc by equation (12):

$$Rh = Rh0 \times (1 + \alpha \times Th) \quad (11)$$

-continued $$Rc = Rc0 \times (1 + \alpha \times Tc) \quad (12)$$
$$= N \times Rh0 \times (1 + \alpha \times Tc)$$

where Rh0 is the resistance value of the heat-generating resistor at 0° C., Rc0 is the resistance value of the resistance temperature detector at 0° C., Th is the temperature of the heat-generating resistor Rh, and Tc is the temperature of the resistance temperature detector Rc. $\alpha$, which is the temperature coefficient of resistance value, is considered to be the same for the heat-generating resistor Rh and the resistance temperature detector Rc, which can be realized by using the same material and providing it with different resistance values.

From equations (8) and (12), $\Delta$Rh, which is the value by which Rh varies when Tc changes by $\Delta$T, is:

$$\Delta Rh = N \times Rh0 \times \alpha \times \Delta T / N \quad (13)$$
$$= Rh0 \times \alpha \times \Delta T$$

Thus, the temperature of the heat-generating resistor Rh varies by the same amount as the amount of change in temperature of the resistance temperature detector Rc due to air.

When heat-generating resistor Rh and the resistance temperature detector Rc have the same specifications in the circuit configuration of the airflow meter 2 shown in FIG. 3, the amount of change in resistance value of the heat-generating resistor Rh is 1/N (=Ic/Ih) times the amount of change in resistance value of the resistance temperature detector Rc. This is due to the fact that, since the current Ic that flows through the resistance temperature detector Rc is 1/N times the current Ih that flows through the heat-generating resistor Rh, the sensitivity of the voltage across the resistance temperature detector Rc to the change in resistance value thereof becomes 1/N times the sensitivity of the voltage across the heat-generating resistor Rh to the change in resistance value thereof.

Figure 4:
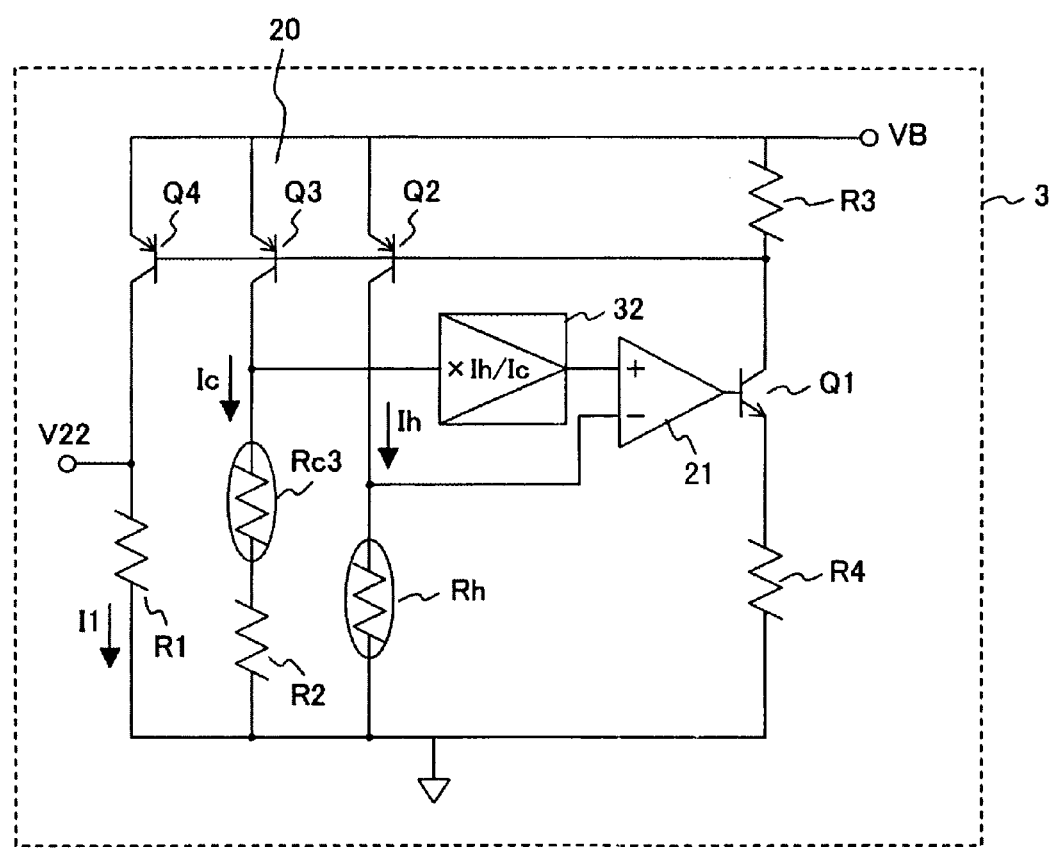
FIG. 4 shows an embodiment in which a heat-generating resistor and a resistance temperature detector employ elements with identical characteristics.

A circuit for solving this problem is shown in FIG. 4 showing an airflow meter 3. It is characteristically provided with an amplifier, in front of the non-inverting input terminal of an operational amplifier 31, for multiplying the change in voltage across the resistance temperature detector Rc by a factor of N (=Ih/Ic). This feature allows the temperature of the heat-generating resistor Rh to be changed by the same amount as the change in temperature of the resistance temperature detector Rc even if the heat-generating resistor Rh and the resistance temperature detector Rc have the same specifications. As a result, the same amount of heat can be dissipated from the heat-generating resistor Rh even if the temperature of air changes.

Figure 5:
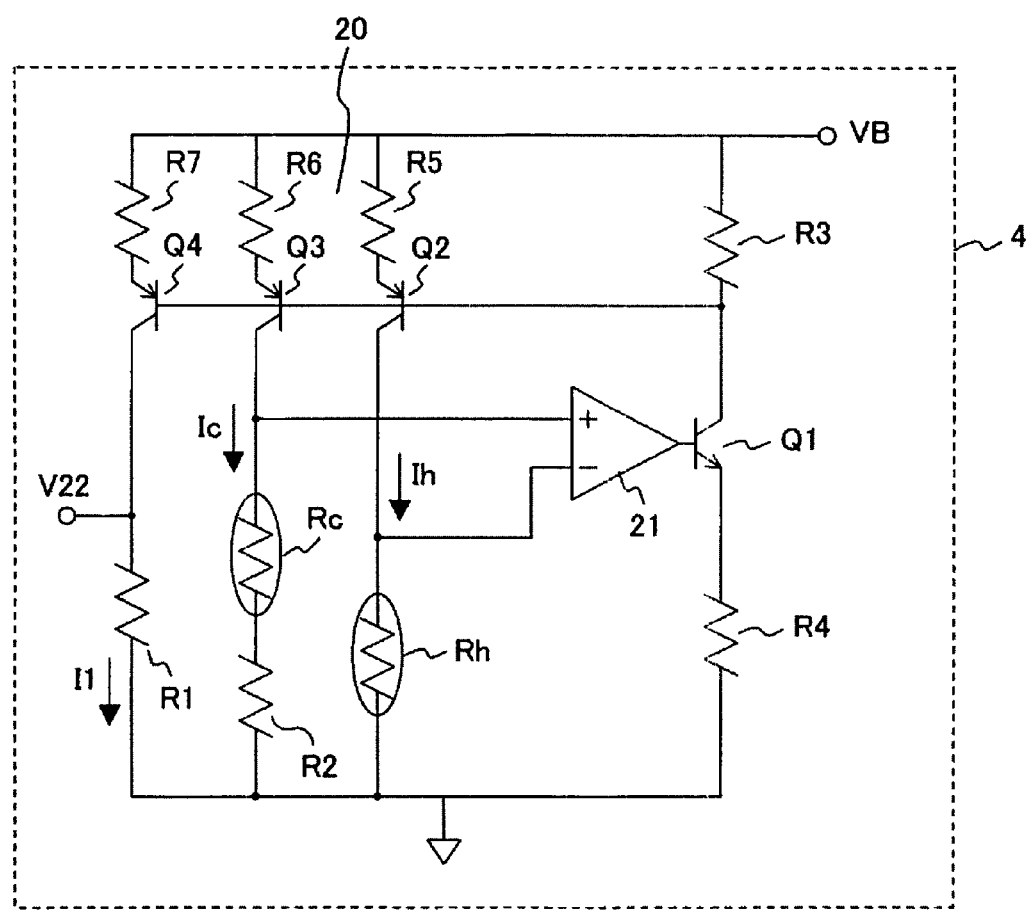
FIG. 5 shows an embodiment in which, in order to improve the matching property of a current mirror circuit, resistors are connected to the emitters of the transistors.

FIG. 5 shows a current mirror circuit with better matching property, which is a means for reducing the influence of variations in transistors. By connecting resistors 5, 6, and 7 to the emitters of PNP transistors Q2, Q3, and Q4, of which the current mirror circuit 20 is composed, the ratio of current mirror currents can be made closer to the ratio of the resistors so that better matching can be obtained. It should be noted, however, that if the resistor values are too large, the voltage that can be applied to the heat-generating resistor Rh decreases, which would go against the object of the invention.

As an airflow rate signal, the current Ih that flows through the heat-generating resistor Rh is used. For this purpose, in the conventional airflow meter 1, the current Ih that flows through the heat-generating resistor Rh is caused to flow through the current-detecting resistor R1. On the other hand, in the airflow meter 2 of the invention, a current with the same magnitude as that of the current Ih through the heat-generating resistor Rh is caused to flow through a current-detecting resistor R1 connected to the heat-generating resistor Rh in parallel via the current mirror circuit, thereby obtaining an output signal.

However, from equation (6), the current Ic that flows through the resistance temperature detector Rc is proportional to the current Ih that flows through the heat-generating resistor, as expressed by:

$$Ic = Ih/N \quad (14)$$

Figure 6:
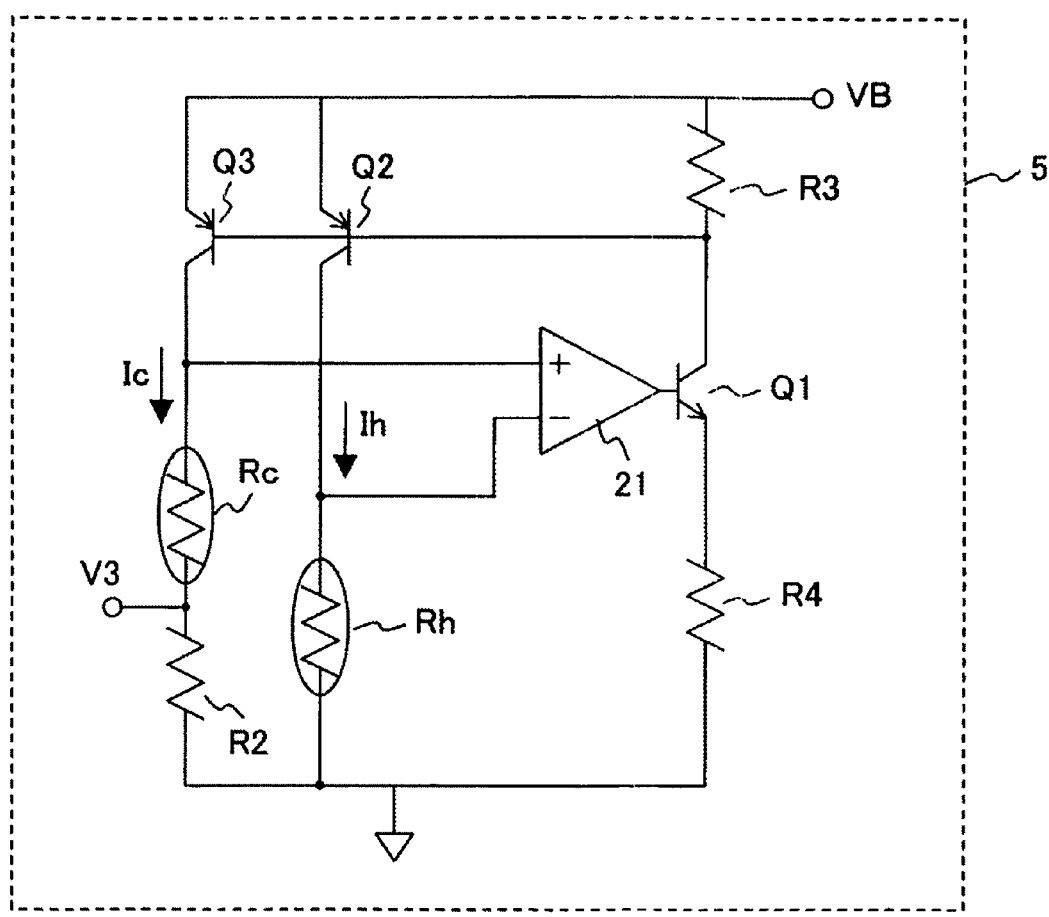
FIG. 6 shows an embodiment in which an airflow rate signal is obtained from a current through a resistance temperature detector.

Thus, the current Ic can also be used as the flow rate signal. The current Ic that flows through the resistance temperature detector Rc also flows through a resistor R2 connected in series to the resistance temperature detector Rc. FIG. 6 shows an airflow meter 5 in which a voltage V3 across the resistor R2 connected in series with the resistance temperature detector Rc is used as a flow rate signal. In this way, the circuit size can be reduced. However, in comparison with the embodiments of FIGS. 3 to 5, these embodiments can provide a stronger airflow signal and are therefore less affected by noise.

In the airflow meter 2 of FIGS. 3 to 5, the output signal is obtained by causing a current with the same magnitude as the current Ih through the heat-generating resistor Rh to flow through the current-detecting resistor R1. The current caused to flow through the current-detecting resistor R1, however, only needs to be proportional to, or linearly (1:1) related to the current Ih through the heat-generating resistor Rh. The current I1 through the current-detecting resistor R1 and the current Ih through the heat-generating resistor Rh are very large as compared with small-signal currents that flow within an integrated circuit. Therefore, the size-ratio of transistors Q2 and Q4 forming the current mirror circuit in the airflow meter 2 of FIG. 3, for example, is adjusted such that the ratio of the current Ih through the heat-generating resistor Rh and the current I1 through the current-detecting resistor R1 is expressed by:

$$Ih/I1 = M \quad (15)$$

In this way, the current consumption by the airflow meter 2 can be reduced, thereby reducing the amount of heat generated by the circuit. A specific embodiment of this feature is incorporated in an airflow meter 6 shown in FIG. 7, of which the configuration is basically the same as that of the embodiments shown in FIGS. 3 to 5 and is different in the following respects.

Figure 7:
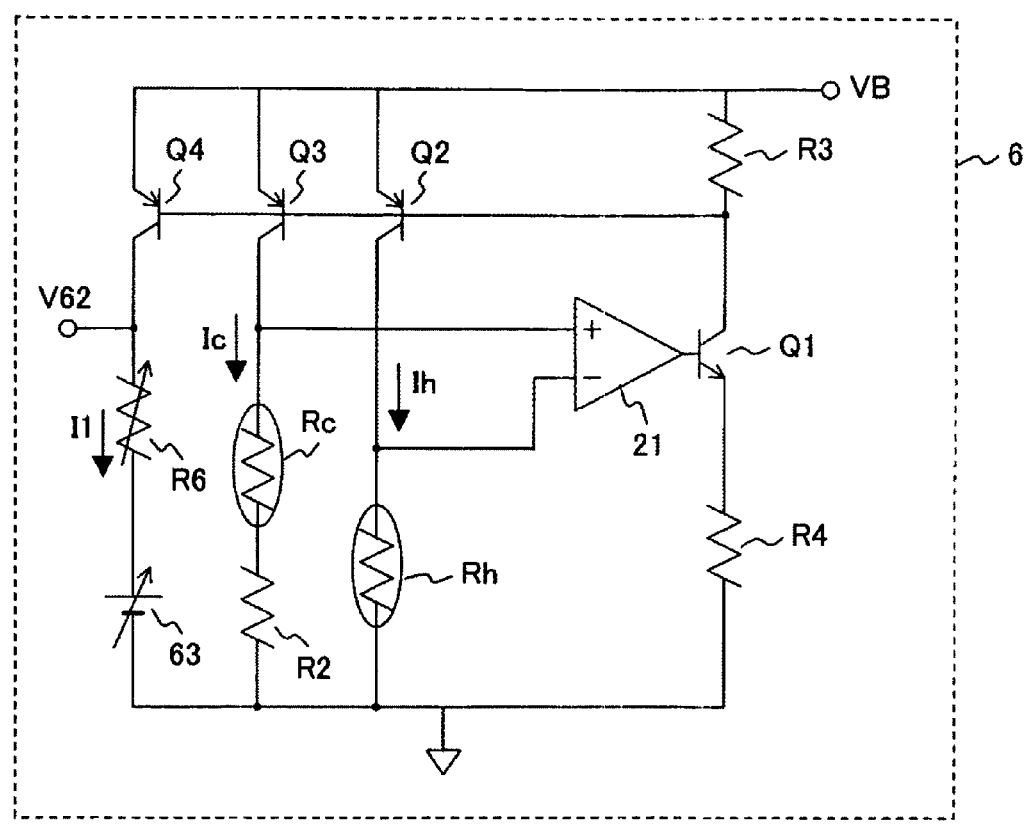
FIG. 7 shows an embodiment in which the airflow signal is output-adjusted by a primary conversion.

Referring to the airflow meter 6 of FIG. 7, a current-detecting resistor R61 through which a current I1 that is proportional to (or linear with respect to) the current Ih through the heat-generating resistor Rh is caused to flow consists of a variable resistor, and a variable constant voltage source 63 is connected in series with the current-detecting resistor R61. In this case, an output signal V62 from the airflow meter 6 can be adjusted by the current-detecting resistor R61 and the variable constant voltage source 63. When the voltage of the variable constant voltage source 63 is V63, V62 is expressed as follows:

$$V62 = R61 \times I1 + V63 \quad (16)$$

From equation (16), it can be seen that the slope can be adjusted by R61 and the intercept can be adjusted by V63.

The most important point in realizing the invention is to improve the matching property of the current mirror circuit 20. When realizing the invention on an integrated circuit, variations in the transistors forming the current mirror circuit must be minimized.

Figure 8:
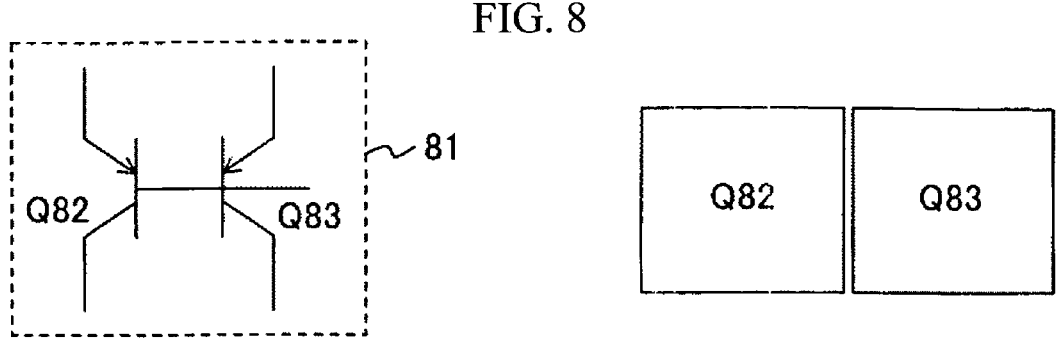
FIG. 8 shows a current mirror circuit and a layout chart concerning an integrated circuit.
Figure 9:
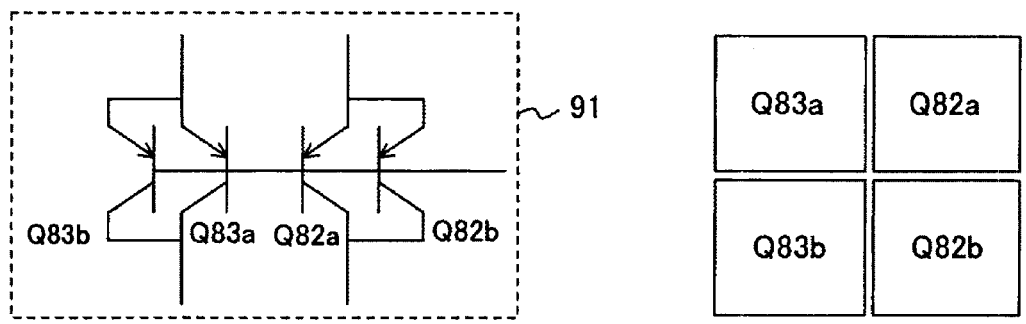
FIG. 9 shows a circuit diagram of a current mirror circuit in which each of the transistors forming the current mirror circuit is comprised of a plurality of transistors so as to reduce variations in the characteristics of the current mirror circuit, and a layout chart.

In order to minimize such variations, each of the transistors Q2, Q3, and Q4 of which the current mirror circuit 20 is comprised needs only to be formed with a plurality of transistors on the circuit diagram. For example, referring to the circuit diagram shown in FIG. 8, each of the two transistors Q82 and 83 forming a current mirror circuit 81 is formed with two transistors, thus forming a current mirror circuit 91 with a total of four transistors Q82a, Q82b, Q83a, and Q83b.

Figure 10:
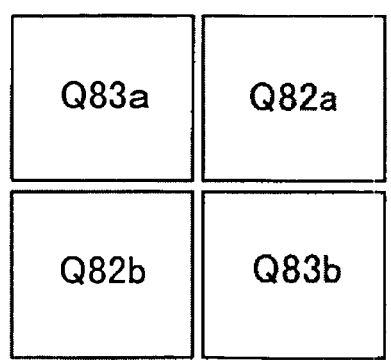
FIG. 10 shows a layout chart for the circuit diagram of FIG. 9, in which transistors are arranged in a diagonal manner.

When actually laying out an IC, characteristics variations can be reduced by disposing the transistors Q82a, Q82b, Q83a, and Q83b diagonally, as shown in FIG. 10, rather than grouping the transistors Q82a and Q82b and the transistors Q83a and Q83b.

Figure 12:
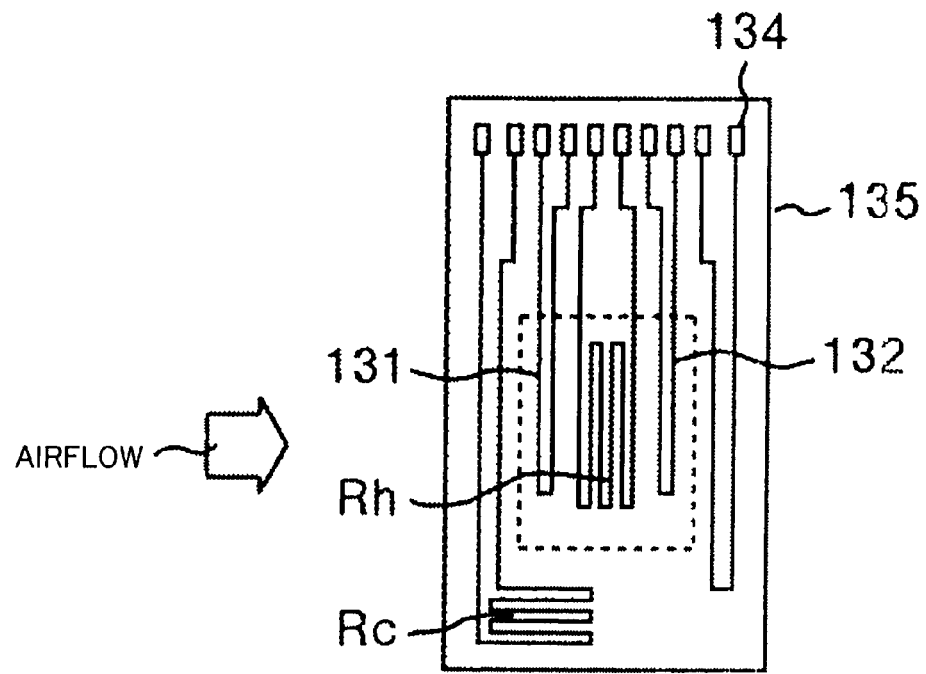
FIG. 12 shows the layout of another embodiment of the invention.
Figure 13:
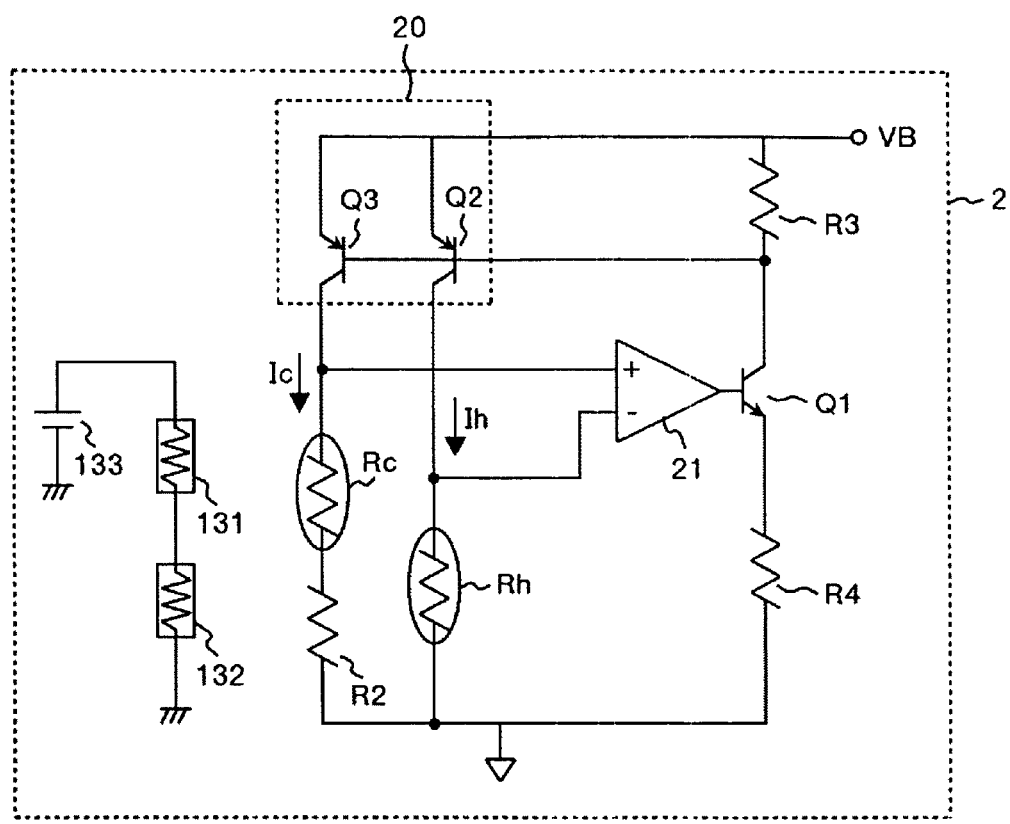
FIG. 13 shows a circuit diagram of the embodiment shown in FIG. 12.

In the foregoing embodiments, the current-detecting resistor for indirectly detecting the current that flows through the heat-generating resistor is connected in parallel with the heat-generating resistor via a power supply that determines the current ratio. Alternatively, resistance temperature detectors 131 and 132 may be disposed upstream and downstream of the heat-generating resistor Rh, as shown in FIG. 12, so that the temperature difference (resistor value difference) between them can be converted into voltage for airflow rate measuring purposes. The heat-generating resistor Rh, resistance temperature detector Rc, upstream resistor 131, downstream resistor 132, and their terminals 134 are mounted on a substrate, as illustrated in an electric circuit diagram shown in FIG. 13. In this case, the heat-generating resistor Rh and the resistance temperature detector Rc are connected in parallel via the transistors Q2 and Q3 of the current mirror circuit 20, as in the foregoing embodiments. The upstream resistor 131 of the heat-generating resistor Rh is cooled by airflow, while the downstream resistor 132 is warmed by an airflow warmed by the heat-generating resistor Rh. Therefore, the resistance value of these resistors varies depending on the temperature, and the temperature difference varies depending on the airflow rate. Thus, by electrically connecting the resistance temperature detectors 131 and 132 to a power supply 133, an electric signal corresponding to the temperature difference between upstream and downstream, namely, the airflow rate, can be obtained.

While in each of the foregoing embodiments the current mirror circuit was comprised of PNP transistors, NPN transistors may alternatively be used.

The fields of application of the airflow meter of the invention are not limited to those for measuring the airflow on automobiles and may include various other fields.

In accordance with the embodiments of the invention, the maximum voltage that can be applied to an airflow detecting element can be increased without requiring modifications in the currently employed element because of the high reliability of the invention. As a result, the time that elapses before a normal signal can be outputted, particularly upon startup, can be shortened.

Thus, the air-fuel ratio control for automotive engines can be activated at an early period, thereby reducing the amount of harmful exhaust emissions.

What is claimed is:

1. A hot-wire airflow meter for measuring airflow rate, comprising:
   a heat-generating resistor for a heating resistor type airflow meter;
   a resistance temperature detector for air temperature compensation;
   a current source that determines the ratio of currents that flow through said heat-generating resistor and said resistance temperature detector; and
   a current-detecting resistor for indirectly detecting the current that flows through said heat-generating resistor,
   wherein said current source comprises at least a current mirror circuit and an operational amplifier, said current mirror circuit comprising first, second, and third transistors connected in parallel,
   wherein said first transistor and said heat-generating resistor are connected in series, said second transistor and said resistance temperature detector for air temperature compensation are connected in series, and said third transistor and said current-detecting resistor are connected in series,
   wherein a voltage between said heat-generating resistor and said first transistor and a voltage between said resistance temperature detector for air temperature compensation and said second transistor are input to said operational amplifier, and
   wherein said first to third transistors are controlled by an output of said operational amplifier such that the current that flows through each of said resistors is controlled to maintain a predetermined ratio.

2. The hot-wire airflow meter according to claim 1, wherein, in order to prevent the heating of said resistance temperature detector for air temperature compensation, said resistance temperature detector has the same resistance temperature coefficient and an N (N is a positive constant) times as much resistance value as said heat-generating resistor.

3. The hot-wire airflow meter according to claim 1, wherein, regarding the setting of the current ratio, the current that flows through said resistance temperature detector for air temperature compensation is set to be 1/N (N is a positive constant) times the current that flows through said heat-generating resistor,
   wherein said operational amplifier multiplies a voltage across said resistance temperature detector and a voltage across a fixed resistor connected in series with said resistance temperature detector, and
   wherein said resistance temperature detector and said heat-generating resistor comprise elements with identical specifications.

4. The hot-wire airflow meter according to claim 1, wherein the transistors of which said current mirror circuit is comprised are PNP transistors, and
   wherein a resistor is connected to the emitter of each transistor for improving the matching property of said current mirror circuit.

5. The hot-wire airflow meter according to claim 1, wherein a current that is 1/M (M is a positive constant) times the current through said heat-generating resistor flows through said current-detecting resistor, and
   wherein a voltage across said current-detecting resistor is output as an airflow rate output signal.

6. The hot-wire airflow meter according to claim 1, wherein said current-detecting resistor is a variable resistor, said meter further comprising an adjustable voltage source connected in series with said current-detecting resistor, and
   wherein the output of said current-detecting resistor is adjustable by a primary conversion.

7. The hot-wire airflow meter according to claim 1, further comprising:
   a resistor provided between the bases and emitters of the transistors forming said current mirror circuit so as to minimize current variations in the event that disturbance appears in a power supply voltage VB.

8. The hot-wire airflow meter according to claim 1, wherein the transistors forming said current mirror circuit are arranged on an integrated circuit in a balanced manner so as to prevent characteristics variations among said transistors.

9. A hot-wire airflow meter for measuring airflow rate, comprising:
- a heat-generating resistor for a heating resistor type airflow meter;
- a resistance temperature detector for air temperature compensation;
- a current source that determines the ratio of currents that flow through said heat-generating resistor and said resistance temperature detector; and
- a current-detecting resistor for indirectly detecting the current that flows through said heat-generating resistor,
- wherein said current source comprises at least a current mirror circuit and an operational amplifier, said current mirror circuit comprising first and second transistors connected in parallel,
- wherein said first transistor and said heat-generating resistor are connected in series, said second transistor, said resistance temperature detector for air temperature compensation, and said current-detecting resistor are connected in series,
- wherein a voltage between said heat-generating resistor and said first transistor and a voltage between said resistance temperature detector for air temperature compensation and said second transistor are input to said operational amplifier, and
- wherein said first and second transistors are controlled by an output of said operational amplifier such that the current that flows through each of said resistors is controlled to maintain a predetermined ratio.

10. The hot-wire airflow meter according to claim 9, wherein, in order to prevent the heating of said resistance temperature detector for air temperature compensation, said resistance temperature detector has the same resistance temperature coefficient and an N (N is a positive constant) times as much resistance value as said heat-generating resistor.

11. The hot-wire airflow meter according to claim 9, wherein, regarding the setting of the current ratio, the current that flows through said resistance temperature detector for air temperature compensation is set to be 1/N (N is a positive constant) times the current that flows through said heat-generating resistor,
- wherein said operational amplifier multiplies a voltage across said resistance temperature detector and a voltage across a fixed resistor connected in series with said resistance temperature detector, and
- wherein said resistance temperature detector and said heat-generating resistor comprise elements with identical specifications.

12. The hot-wire airflow meter according to claim 9, further comprising:
- a resistor provided between the bases and emitters of the transistors forming said current mirror circuit so as to minimize current variations in the event that disturbance appears in a power supply voltage VB.

13. The hot-wire airflow meter according to claim 9, wherein the transistors forming said current mirror circuit are arranged on an integrated circuit in a balanced manner so as to prevent characteristics variations among said transistors.

14. A hot-wire airflow meter for measuring airflow rate, comprising:
- a heat-generating resistor for a heating resistor type airflow meter;
- a resistance temperature detector for air temperature compensation;
- a current source that determines the ratio of currents that flow through said heat-generating resistor and said resistance temperature detector; and
- a current-detecting resistor for indirectly detecting the current that flows through said heat-generating resistor,
- wherein said current source comprises at least a current mirror circuit and an operational amplifier, said current mirror circuit comprising first, second, and third transistors connected in parallel,
- wherein said first transistor and said heat-generating resistor are connected in series, said second transistor and said resistance temperature detector for air temperature compensation are connected in series, and said third transistor and said current-detecting resistor are connected in series,
- wherein a voltage between said heat-generating resistor and said first transistor and a voltage between said resistance temperature detector for air temperature compensation and said second transistor are input to said operational amplifier,
- wherein said first to third transistors are controlled by an output of said operational amplifier such that the current that flows through each of said resistors is controlled to maintain a predetermined ratio, and
- wherein said heat-generating resistor, said resistance temperature detector for air temperature compensation, and said current-detecting resistor are connected in parallel via said current source that determines the current ratio.

15. A hot-wire airflow meter for measuring airflow rate, comprising:
- a heat-generating resistor for a heating resistor type airflow meter;
- a resistance temperature detector for air temperature compensation;
- a current source that determines the ratio of currents that flow through said heat-generating resistor and said resistance temperature detector; and
- a current-detecting resistor for indirectly detecting the current that flows through said heat-generating resistor,
- wherein said current source comprises at least a current mirror circuit and an operational amplifier, said current mirror circuit comprising first and second transistors connected in parallel,
- wherein said first transistor and said heat-generating resistor are connected in series, said second transistor, said resistance temperature detector for air temperature compensation, and said current-detecting resistor are connected in series,
- wherein a voltage between said heat-generating resistor and said first transistor and a voltage between said resistance temperature detector for air temperature compensation and said second transistor are input to said operational amplifier,
- wherein said first and second transistors are controlled by an output of said operational amplifier such that the current that flows through each of said resistors is controlled to maintain a predetermined ratio,
- wherein said current-detecting resistor and said resistance temperature detector for air temperature compensation are connected in series, and
- wherein these resistors and said heat-generating resistor are connected in parallel via said current source that determines the current ratio.

* * * * *